US007139852B2

(12) United States Patent
LaBerge

(10) Patent No.: US 7,139,852 B2
(45) Date of Patent: Nov. 21, 2006

(54) MEMORY BUS POLARITY INDICATOR SYSTEM AND METHOD FOR REDUCING THE AFFECTS OF SIMULTANEOUS SWITCHING OUTPUTS (SSO) ON MEMORY BUS TIMING

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/082,572

(22) Filed: Mar. 16, 2005

(65) Prior Publication Data

US 2005/0182894 A1 Aug. 18, 2005

Related U.S. Application Data

(63) Continuation of application No. 10/081,652, filed on Feb. 21, 2002, now Pat. No. 6,898,648.

(51) Int. Cl.
G06F 13/00 (2006.01)
G11C 7/00 (2006.01)
G06F 12/10 (2006.01)

(52) U.S. Cl. ................... 710/100; 365/189.01
(58) Field of Classification Search ............... 710/100, 710/305, 52, 72; 377/41; 326/21, 52, 62; 365/189.01, 189.07
See application file for complete search history.

(56) References Cited

U.S. PATENT DOCUMENTS 4,107,785 A * 8/1978 Seipp ........................ 712/223
4,667,337 A 5/1987 Fletcher ........................ 377/41
5,220,526 A * 6/1993 Giles et al. .................... 365/49
5,890,005 A 3/1999 Lindholm ............... 395/750.03
6,081,783 A * 6/2000 Divine et al. ............... 704/500
6,181,634 B1 * 1/2001 Okita .................... 365/230.05
6,195,759 B1 2/2001 Salmon ....................... 713/600
6,243,779 B1 6/2001 Devanney et al. .......... 710/129
6,671,212 B1 12/2003 Macri et al. ........... 365/189.07
6,707,693 B1 * 3/2004 Ichiriu ........................ 365/49
6,714,460 B1 3/2004 LaBerge ................. 365/189.01
6,781,857 B1 * 8/2004 Lien et al. .................... 365/49

OTHER PUBLICATIONS

"Logic synthesis of multilevel circuits with concurrent error detection" by Touba et al. (abstract only) Publication Date: Jul. 1997.*
Hung C., "On the Edge Preserving Smoothing Filter", Engineering new New Century, IEEE Proceedings, Apr. 1997. 2 pages (Abstract only).

(Continued)

*Primary Examiner*—Gopal C. Ray
(74) *Attorney, Agent, or Firm*—Dorsey & Whitney LLP

(57) ABSTRACT

A method and system transfer read data from a memory device having a data bus and a data masking pin adapted to receive a masking signal during write operations of the memory device. The method includes placing a sequence of read data words on the data bus and applying a data bus inversion signal on the data masking pin, the data bus inversion signal indicating whether the data contained each read data word has been inverted. Another method and system transfer data over a data bus. The method includes generating a sequence of data words, at least one data word including data bus inversion data. The sequence of data words is applied on the data bus and is thereafter stored. The data bus inversion data is applied to invert or not invert the data contained in the stored data words.

22 Claims, 6 Drawing Sheets

OTHER PUBLICATIONS

Intel® Datasheet, "Intel® Pentium® 4 Processor with 512KB L2 Cache on .13 Micron Process at 2 GHz and 2.20 GHz", Jan. 2002, pp. 1-7 and 85.

Scheibner, D. et al., "Inversion of Modified Beamformed Array Data", Acoustics, Speech, and Signal Processing, IEEE International Conference on ICASSP, vol. 10, Apr. 1985. 2 pages (Abstract only).

* cited by examiner

|    | DBI | D1 | D2 | D3 | ··· | D7 | D8 |
|----|-----|----|----|----|-----|----|----|
| I1 | 0   | 1  | 0  | 1  |     | 1  | 0  |
| I2 | 1   | 1  | 0  | 1  |     | 0  | 0  |
| I3 | 1   | 1  | 0  | 1  |     | 1  | 0  |
| I4 | X   | 1  | 0  | 1  |     | 0  | 0  |
| I5 | X   | 1  | 0  | 1  |     | 1  | 0  |
| I6 | X   | 0  | 1  | 1  |     | 0  | 0  |
| I7 | X   | 1  | 0  | 1  |     | 1  | 0  |
| I8 | 0   | 0  | 1  | 0  |     | 0  | 0  |

I1=0   I2=1   I3=1           I8=0

MEMORY BUS POLARITY INDICATOR SYSTEM AND METHOD FOR REDUCING THE AFFECTS OF SIMULTANEOUS SWITCHING OUTPUTS (SSO) ON MEMORY BUS TIMING

CROSS-REFERENCE TO RELATED APPLICATION

This application is a continuation of U.S. patent application Ser. No. 10/081,652, filed Feb. 21, 2002 now U.S. Pat. No. 6,898,648.

TECHNICAL FIELD

The present invention relates generally to integrated circuits, and more specifically to synchronizing a clock signal with data signals being transferred to and from an integrated circuit.

BACKGROUND OF THE INVENTION

In synchronous systems, devices in the system are clock clocked by an external clock signal and perform operations at predetermined times relative the rising and falling edges of the clock signal. For example, in a typical memory system, a memory controller applies commands to synchronous memory devices and data is transferred between the memory devices and the controller in synchronism with an external clock signal applied to the controller and memory devices. In the memory system, the memory controller must place write data being transferred to the memory devices on a data bus at the proper times relative to rising and falling edges of the external clock signal to ensure that the memory devices successfully capture the data. Similarly, the memory devices must place read data being transferred to the controller on the data bus at proper times relative to rising and falling edges of the clock signal to ensure the controller successfully captures the data.

FIG. 1 is a simplified block diagram of a conventional memory system 100 including a synchronous memory 102, such as a DDR SDRAM, coupled to a memory controller 104 through an address bus ADDR, data bus DATA, and control bus CONT. An external clock signal CLK is applied to the memory 102 and controller 104, and the transfer of data over the ADDR, DATA, and CONT busses occurs at proper times relative to edges of the CLK signal to ensure a receiving device successfully captures the data being transferred. The data bus DATA includes a data strobe signal DQS that the memory 102 applies on the data bus DATA along with a read data word DQ1–N, and the memory controller 104 uses the DQS signal to successfully capture the read data word. During write operations, the memory controller 104 applies the DQS signal on the data bus DATA along with a write data word DQ1-N, and the memory 102 uses the DQS signal to successfully capture the write data word. The memory controller 104 also supplies a data masking signal DM to the memory 102 over the data bus DATA to control the masking of write data being transferred to the memory.

In operation, the memory controller 104 applies a data transfer command to the memory 102 in the form of appropriate address and control signals on the ADDR and CONT busses, respectively. The memory latches the applied command in response to a rising edge of the CLK signal, and thereafter decodes and processes the latched command. In response to a read command, the memory 102 accesses the addressed data, places the data on the data bus DATA as one or more read data words DQ1–N, and strobes or drives the DQS signal. The memory controller 104 captures read data words DQ1–N in response to rising and falling edges of the DQS signal. During write operations, in addition to applying a write command to the memory 102, the memory controller 104 places write data words DQ1–N on the data bus DATA and drives the DQS signal. In response to the write command, the memory 102 captures write data words DQ1–N in response rising and falling edges of the DQS signal, and stores the write data words in locations corresponding to the supplied address. The memory 102 also masks the DM signal applied coincident with each write data word DQ1–N, and masks or does not transfer the captured write data word to the addressed location when the DM signal is activated.

To successfully capture the data words DQ1–N being transferred over the data bus DATA, the DQS signal must be synchronized with the data words. During read operations, the memory 102 places each read data word DQ1–N on the data bus DATA in synchronism with a rising or falling edge of the DQS signal. In modern memory devices, the speed of the data bus is increasing, meaning that the frequency of the DQS signal is greater and the duration for which data words placed on the data bus are valid is decreasing (i.e., shorter read and write cycle times). As a result, shifts between the DQS signal and the data words become more critical since a smaller shift may now result in spurious data being captured. This is true because a smaller shift in the DQS signal relative to the data words may result in the memory 102 or controller 104 capturing the data words when the words are no longer valid, as will be appreciated by those skilled in the art.

A width N of the data bus DQ is being increased in modern synchronous memory devices to transfer more data to and from the memory 102 each cycle of the CLK signal, where the width N of the data bus is defined as the number of signals or bits N in a data word DQ1–N. This increase in the width N of the data bus DATA can result in an undesirable skew or shift of the read data words DQ1–N relative to the DQS signal. Such a shift can occur as more data drivers (not shown in FIG. 1) in the memory 102 draw more current from a power supply (not shown) in driving more bits in each data word DQ1–N from a first logic state to the complementary logic state when a new data word is being placed on the data bus DATA. Such a shift is known as simultaneous switching outputs (SSO) pushout, as will be understood by those skilled in the art. For example, if a first read data word DQ1–N includes all 0's and the next read data word includes all 1's, each data driver draws current from the power supply in driving the corresponding bit from a voltage level corresponding to a logic 0 to a voltage level corresponding to a logic 1. The larger the width N of the data bus DATA, the more data drivers required and the more current demanded from the power supply in this situation, and the larger the voltage drop across each data line due to an increased inductance L of each data line, as will be discussed in more detail below.

As the width N increases, the cumulative current required by all data drivers can exceed a maximum current capable of being supplied by the power supply. In this situation, the data drivers receive less current than required to drive the corresponding bits from a voltage level corresponding to a first logic state to a voltage level corresponding to the complementary logic state according to specified timing characteristics of the memory 102. One such timing characteristic is an access time, which defines a timing window around the transition of the DQS signal in which transitions of the bits in the data words must occur in order to allow the memory controller 104 to successfully capture the data words in response to the DQS signal. The reduced current causes the data drivers to drive the corresponding bits to the complementary logic states more slowly and thereby undesirable shifts the data word DQ1–N relative to the DQS signal, possibly shifting the data word outside the specified access time for the memory 102. The shift between the transition of the DQS signal and each data word DQ1–N depends on the number of bits changing logic state and the logic state to which the bits are changing, as will be understood by those skilled in the art. In addition to a reduced current being supplied to the data drivers, physical constraints on the size of the power lines (not shown) that supply power to the data drivers can result in the power lines having an inductance that causes a relatively large voltage drop to develop across the power lines when the data drivers demand a maximum current over a short period of time (V=Ldi/dt). Such a voltage drop can also slow the rate at which the data drivers drive the corresponding bits to the required voltage levels and shift the data words outside the specified access time.

FIG. 2 is a signal timing diagram illustrating shifts in the read data words DQ1–N relative to the DQS signal as the number of bits transitioning from a first logic state to the complementary logic state varies. In FIG. 2, three situations are illustrated where a new data word D0–2 is being placed on the data bus DATA with the prior data word on the data bus in each instance designated PD0–2, respectively. In the first situation, no bits are transitioning or changing state from the PD0 word to the D0 word (PD0=D0), and the data drivers place the D0 word on the data bus DATA in synchronism with the DQS signal at a time T0 and within a specified access time TAC of the memory 102. In the second situation, one half the bits change from a first logic state to the complementary logic state between the data words PD1 and D1. The data drivers place the D1 word on the data bus DATA at a time T1 just after the transition of the DQS signal at the time T0, which is also within the specified access time TAC. Thus, the data drivers place the data word D1 on the data bus more slowly relative to the data word D0 due to more bits changing from a first logic state to the complementary logic state.

In the third situation shown in FIG. 2, all bits change state between the data words PD2 and D2, and the data word D2 is placed on the data bus DATA at a time T2 after the transition of the DQS signal at the time T0. In this situation, the data word D2 is placed on the data bus DATA outside the specified access time TAC of the memory 102 due to the slower operation of the data drivers resulting from all N bits in the data word changing state. If the width N of the data bus DATA is increased, the data words will be delayed even more relative to the transition of the DQS signal when all or a large number of bits change from a first logic state to the complementary logic state, assuming the same power is supplied to the data drivers. Additional power could be supplied to the data drivers to eliminate these undesirable shifts, but it is not always practicable or cost effective to increase the power, as will be appreciated by those skilled in the art. The concepts described above have been discussed with reference to read operations because timing budgets for read cycles are typically tighter (less margin) than for write cycles and thus timing shifts are more critical, but the concepts are equally applicable to write cycles.

An approach that has been utilized in microprocessors, such as the Intel® Pentium® 4, is to include additional pins in the data bus for transferring one or more data bus inversion signals DBI generated by the processor. Each data bus inversion signal is associated with a group of bits, such as a byte, of data on the data bus. In operation, the processor determines whether more than half the bits in each byte would change logic state from a current byte on the data bus to a next byte to be placed on the data bus. If more than one half the bits in the byte would change logic state, the processor inverts the data bits in the next byte and activates the DBI signal associated with the byte. A receiving device, such as a memory controller, thereafter receives the next byte and the active DBI signal, and inverts the data in the next byte in response to the active DBI signal, thus returning the inverted data to its actual values. This approach requires the inclusion of additional pins on the processor and receiving devices, which increases the cost of the processor and receiving devices due to the increased number of pins, as will be appreciated by those skilled in the art. Moreover, as the width of the data bus increases, more DBI signals and associated pins are required, which consumes even more pins on the processor and receiving devices.

There is a need for a system and method for providing data words in synchronism with a clock signal in integrated circuits having wide data busses independent of the number of bits the data words changing from a first logic state to a complementary logic state.

SUMMARY OF THE INVENTION

According to one aspect of the invention, a system and method provide data from a memory device by providing first data and comparing second data to the first data to determine a number of bits of the second data transitioning logic states. The second data is provided and data inversion information is provided concurrently with the second data from a terminal of the memory device. The terminal from which the data inversion information is provided receives information unrelated to data inversion information during a write operation to the memory device.

According to another aspect of the invention, a system and method provide data from a memory device by comparing bits of a sequence of data words to determine whether each bit changes logic states from one data word to another and generating bit polarity data indicative of the number of bits changing logic states from one respective data word to another in the sequence. The bit polarity data and the sequence of data words are provided from the data terminals of the memory device.

According to another aspect of the invention, a system and method retrieve data from a memory device by receiving read data from data terminals of the memory device and receiving bit polarity data from a terminal of the memory device concurrently with receiving the read data, the terminal for applying data unrelated to bit polarity data during a write operation, the bit polarity data indicative of whether the read data is complementary.

DETAILED DESCRIPTION OF THE INVENTION

Figure 1:
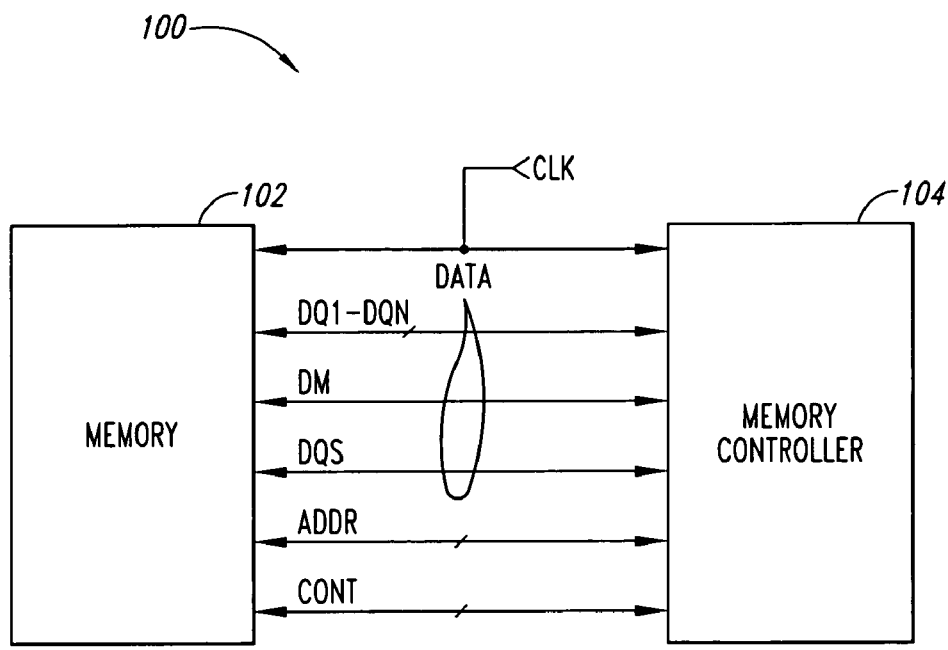
FIG. 1 is a functional block diagram illustrating a conventional memory system including a memory and memory controller that transfer data words to each other over a data bus.
Figure 2:
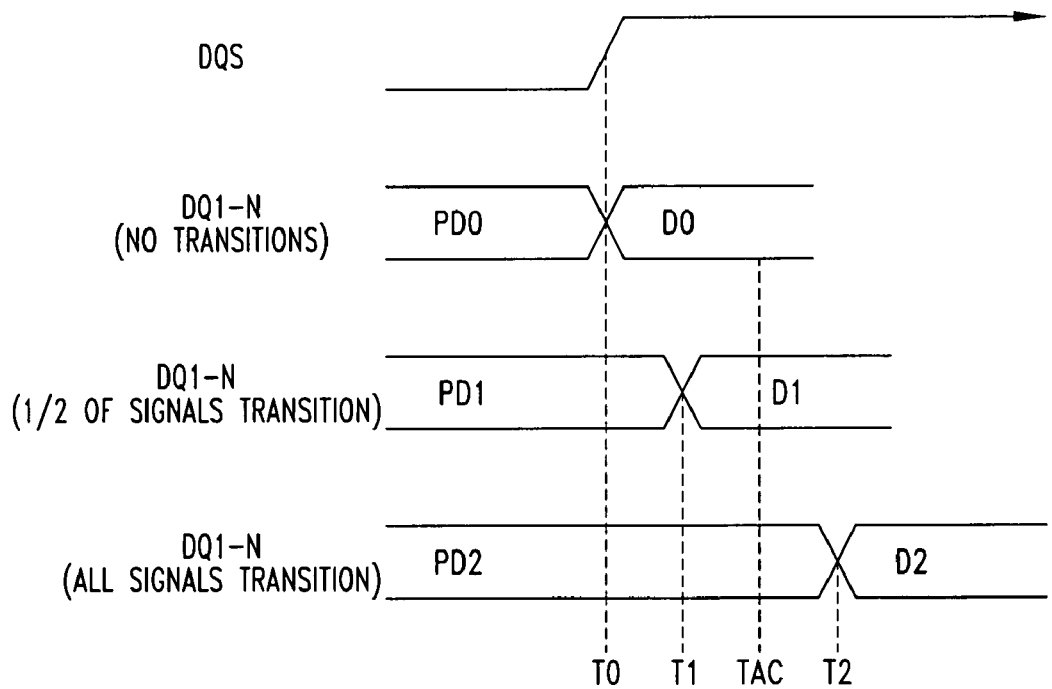
FIG. 2 is a signal timing diagram illustrating shifts between read data words and a data strobe signal in the memory of FIG. 1 as the number of bits changing logic state between consecutive read data words varies.
Figure 3:
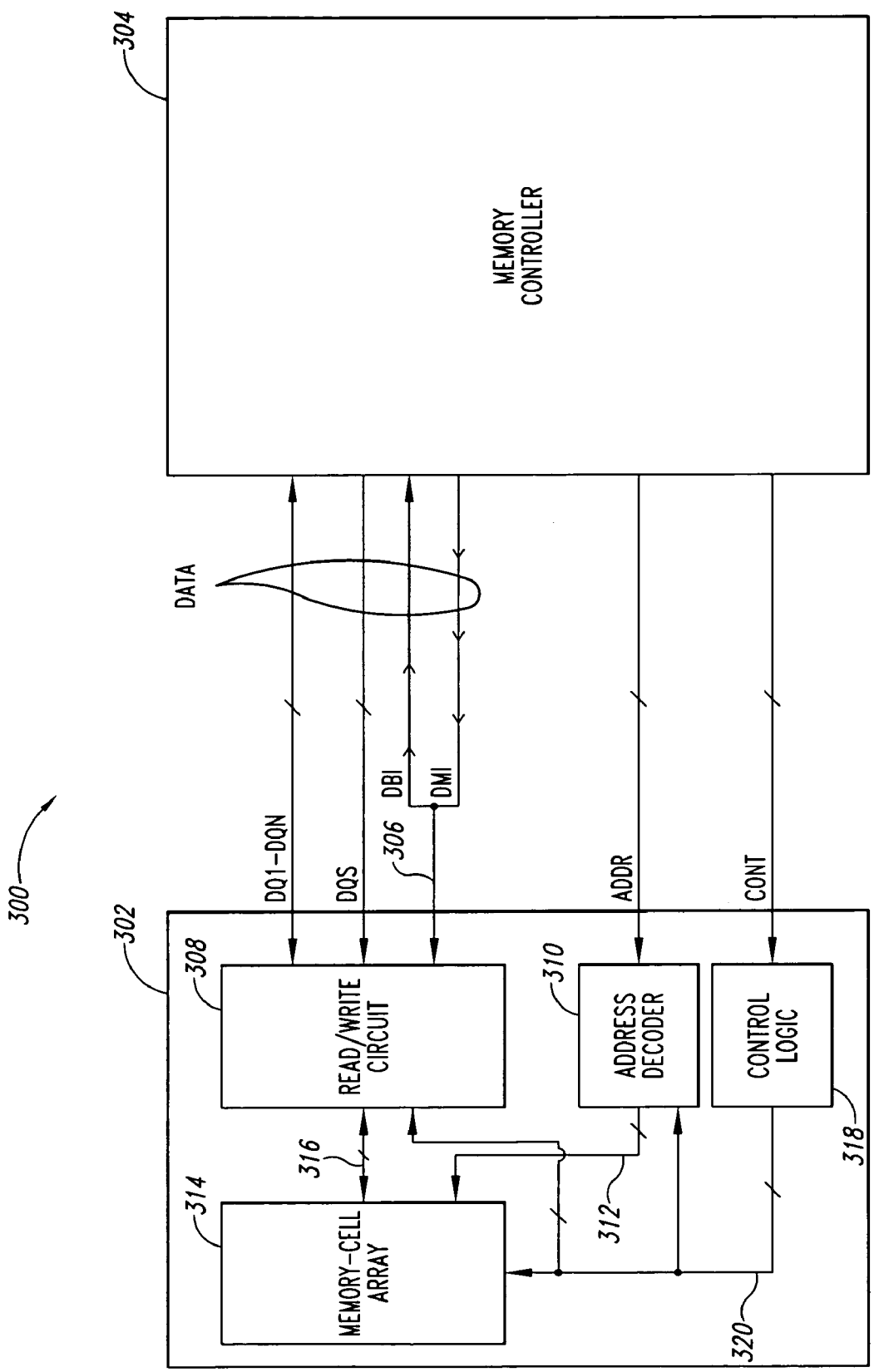
FIG. 3 is a functional block diagram illustrating a memory system including a memory that supplies a data bus inversion signal to a memory controller over a data masking pin according to one embodiment of the present invention.

FIG. 3 is a functional block diagram illustrating a memory system 300 including a memory 302 that transfers data bus inversion information to a memory controller 304 over a data masking pin 306 of the memory during read data transfer operations. The memory 302 selectively outputs true or inverted read data words DQ1–N on a data bus DATA to minimize the switching of bits between consecutive read data words, and activates a data bus inversion signal DBI on the data masking pin 306 when inverted data is output and deactivates the DBI signal when true data is output, as will be explained in more detail below. The data masking pin 306 would normally be unused during read operations, but in the memory system 300 the memory 302 uses the data masking pin to apply the DBI signal to the memory controller 304 during read operations and in this way eliminates the need for additional dedicated pins on both the memory and memory controller, which reduces the costs of these devices. Moreover, the memory system 300 allows the memory 302 to transfer read data words DQ1–N to the memory controller 304 within specified timing parameters even as a width N of the data bus DATA increases since the transfer of true and inverted read data words minimizes the switching of bits in consecutive read data words and thereby reduces current required by the memory in driving the data bus, as will be discussed in more detail below. In the following description, certain details are set forth to provide a sufficient understanding of the present invention. However, it will be clear to one skilled in the art that the present invention may be practiced without these particular details.

The memory 302 includes a read/write circuit 308 that is coupled to the external data bus DATA to transfer data words DQ1–N to and receive data words from the memory controller 304. During write operations, the memory controller 304 applies write data words DQ1–N and a data strobe signal DQS on the data bus DATA, and the read/write circuit 308 stores respective write data words in response to rising and falling edges of the DQS signal. During read operations, the read/write circuit 308 applies read data words DQ1–N and the DQS signal on the data bus DATA, and the memory controller 304 stores respective read data words in response to rising and falling edges of the DQS signal. The read/write circuit 308 further receives a data masking signal DM applied on the pin 306 of the memory 302, and masks write data words DQ1–N in response to the data masking signal during write operations.

During read operations, the read/write circuit 308 compares the data bits DQ1–N in a current read data word CDW<1:N> being output on the data bus DATA with the data bits in a next read data word NDW<1:N> to be placed on the data bus, and determines the number of bits that change from a first logic state in the current read data word to the complementary logic state in the next read data word. When the number of data bits DQ1–N changing from a first logic state in the CDW<1:N> word to the complementary logic state in the NDW<1:N> is less than or equal to one half the number of data bits N in each read data word (i.e., less than or equal to N/2), the read/write circuit 308 deactivates the DBI signal and thereafter outputs the next read data word NDW<1:N> and inactive DBI signal on the data bus DATA. In contrast, when the number of data bits DQ1–N changing from a first logic state in the CDW<1:N> word to the complementary logic state in the NDW<1:N> is greater than one half the number of data bits N in each read data word (i.e., greater than N/2), the read/write circuit 308 inverts the next read data word NDW<1:N> to thereby generate an inverted next read data word NDW<1:N>* and also activates the DBI signal. The read/write circuit 308 thereafter outputs the inverted next read data word NDW<1:N>* and the active DBI signal on the data bus DATA.

Figure 4:
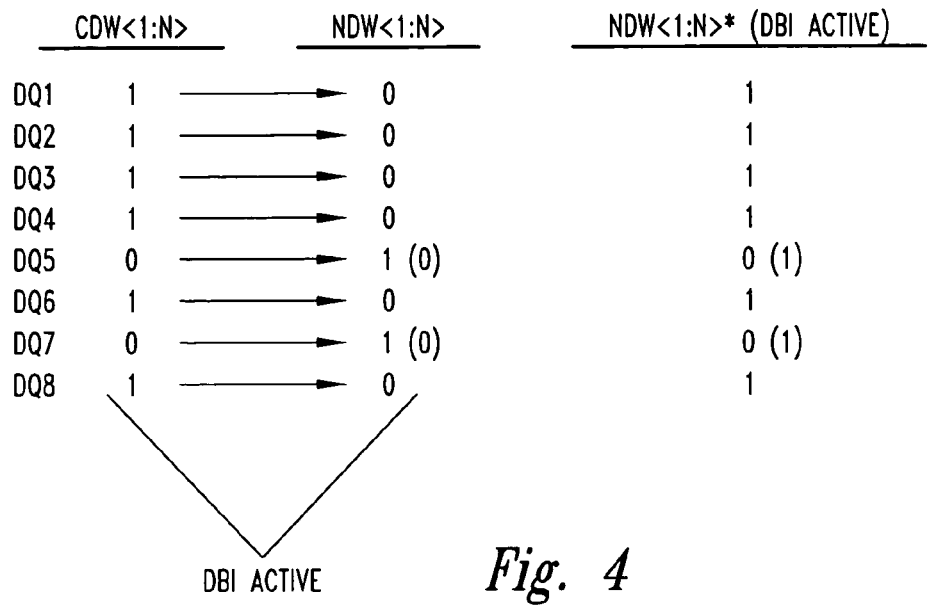
FIG. 4 is a diagram illustrating the operation of the read/write circuit of FIG. 3 generating the data bus inversion signal and inverted data words.

FIG. 4 illustrates the operation of the read/write circuit 308 in generating an inverted next read data word NDW<1:N>*. In the example of FIG. 4, N equals 8 so that each data word includes 8 bits. The current data word CDW<1:N> has a value (11110101) and the next data wordNDW<1:N> has a value (00001010). In this example, the read/write circuit 108 determines the bits DQ1–4, DQ6, and DQ8 are changing from logic 1s to logic 0s, which means greater than one half of the 8 bits is changing from a first logic state to the complementary logic state. In this situation, the read/write circuit 308 inverts the NDW<1:N> word to generate the NDW<1:N>* word by complementing the bits DQ1–8 in the NDW<1:N> word. Thus, the NDW<1:N>* word equals (11110101), which is the complement or inverse of the NDW<1:N> word (00001010). The read/write circuit 308 also activates the DBI signal, as indicated in FIG. 4. Thus, when more than one half the bits DQ1–N would change from a first logic state to the complementary logic state, the read/write circuit 308 outputs the NDW<1:N>* word to reduce the number of bits that must be driven to the complementary logic state and thereby reduce timing shifts of the data words relative to the DQS signal.

Note that the operation of the read/write circuit 308 described above assumes a current read data word CDW<1:N> is being output on the data bus DATA. In some situations, there may not be a current data word CDW<1:N> on the data bus DATA against which to compare the first NDW<1:N> to be placed on the data bus. For example, where the memory 302 is operating in the write mode and the memory controller 304 applies a read command to the memory, data on the data bus DATA bus may be indeterminate prior to the first read data word being placed on the data bus. The read/write circuit 308 could, in this situation, place the true version of the first read data word on the data bus and deactivate the DBI signal. Alternatively, the read/write circuit 308 could place the inverted version of the first read data word on the data bus DATA and activate the DBI signal.

The memory 302 further includes an address decoder 310 that receives address bits A0–AX from the controller 104 over an address bus ADDR, and decodes these address bits and applies decoded address signals 312 to a memory-cell array 314. The memory-cell array 314 includes a plurality of memory cells (not shown) arranged in rows and columns, each memory cell storing a bit of data. The data stored in the memory cells is accessed in response to the decoded address signals 312 from the address decoder 310, and is transferred to and from the read/write circuit 108 through an internal data path 316. The memory 302 also includes control logic 318 that receives a plurality of control signals applied on an external control bus CONT. In response to the control signals, the control logic 318 generates a plurality of control and timing signals 320 to control the timing and operation of the address decoder 310, memory-cell array 314, and read/write circuit 308 during operation of the memory 302.

In operation of the memory system 300, the memory controller 304 applies address, control, and data signals to the memory 302 over the address bus ADDR, control bus CONT, and data bus DATA, respectively, to control the operation of the memory. The control logic 318 generates the appropriate control and timing signals 320 to control the address decoder 310, memory-cell array 314, and read/write circuit 308 during operation. During read operations, the memory controller 304 applies a read command to the memory 302 in the form of appropriate address signals on the address bus ADDR and control signals on the control bus CONT. In response to the applied address signals, the address decoder 302 accesses addressed memory cells in the memory-cell array 306 which, in turn, applies read data words D<1:N> corresponding to the data stored in the addressed memory cells over the internal data path 316 to the read/write circuit 308. The read/write circuit 308 compares the data bits DQ1–N in a current read data word CDW<1:N> being output on the data bus DATA with a next read data word NDW<1:N> to be placed on the data bus, and determines the number of bits that change from a first logic state in the current read data word to the complementary logic state in the next read data word. The read/write circuit 308 places the true next data word NDW<1:N> and inactive DBI signal on the data bus DATA when less than half the number of data bits DQ1–N change from a first logic state to the complementary logic state, and places the inverted next data word NDW<1:N>* and active DBI signal on the data bus when greater than half the data bits change. Along with the NDW<1:N> or NDW<1:N>* word and DBI signal, the read/write circuit 308 also drives the DQS signal.

The memory controller 304 latches the NDW<1:N> or NDW<1:N>* word placed on the DATA bus along with the DBI signal in response to the DQS signal. When the latched DBI signal is active, the memory controller 304 inverts the NDW<1:N>* word to thereby generate the true next read data word NDW<1:N> corresponding to the actual data read from the memory 302. If the latched DBI signal is inactive, the memory controller 104 does not invert the latched NDW<1:N> word since the data bits DQ1–N in this word were not inverted prior to placing the word on the data bus DATA.

During write operations, the memory controller 304 applies a write command to the memory 302 in the form of appropriate address signals and control signals on the ADDR and CONT buses, respectively, and also applies write data words WDW<1:N> on the data bus DATA. Once again, in response to the applied address signals, the address decoder 310 accesses the addressed memory cells in the memory-cell array 314. The read/write circuit 308 transfers the applied write data words WDW<1:N> over the internal data path 316 and into the addressed memory cells in the memory-cell array 306 subject to the data masking signal DM from the memory controller 304. The control logic 318 operates during write operations to generate the appropriate control and timing signals 320 to control the address decoder 310, memory-cell array 314, and read/write circuit 308.

In the memory system 300, the memory 302 uses the data masking pin 306 of the memory during read operations to supply the DBI signal to the memory controller 304. In this way, an extra dedicated pin on the memory 302 for the DBI signal is not required which, as previously discussed, reduces the cost of memory modules containing a plurality of memories 302. The memory system 300 minimizes the switching of bits DQ1–N in consecutive read data words DW<1:N>, which reduces the current required by the read/write circuit 308 in driving the data bus and thereby reduces timing variations between data words and the DQS signal as more bits would otherwise change logic states between consecutive data words without the data bus inversion scheme of the memory system 300. In this way, the memory system 300 reduces the SSO pushout on the data bus DATA.

It should be noted that in the memory 302 would typically include a plurality of data masking signals DM and associated pins 306, with each data masking signal being associated with a corresponding byte of data bits DQ1–N on the data bus DATA. For example, the data bus DATA can be 32 bits wide (N=32), which means that each data word DW<1:N> includes four bytes B1–4 formed by the data bits DQ1–8, DQ9–16, DQ17–24, and DQ25–32, respectively. The memory 302 would typically includes four data masking signals DM1–4 in this situation to allow the bytes B1–4 to be independently masked. In this situation, the read/write circuit 108 operates as previously described for each byte B1–4 in a data word DW<1:32>. Thus, the read/write circuit 308 compares the logic states of data bits DQ1–8 in the current byte B1 on the data bus DATA with the logic states of these bits in the next byte B1 to be placed on the data bus, and when more than half the bits change from a first logic state to the complementary logic state the read/write circuit activates the DM1 signal and inverts the data bits DQ1–8. The read/write circuit 308 operates in the same way on the bytes B2–4 to selectively invert or not invert the bytes and activate or deactivate the DM2–4 signals.

Figure 5:
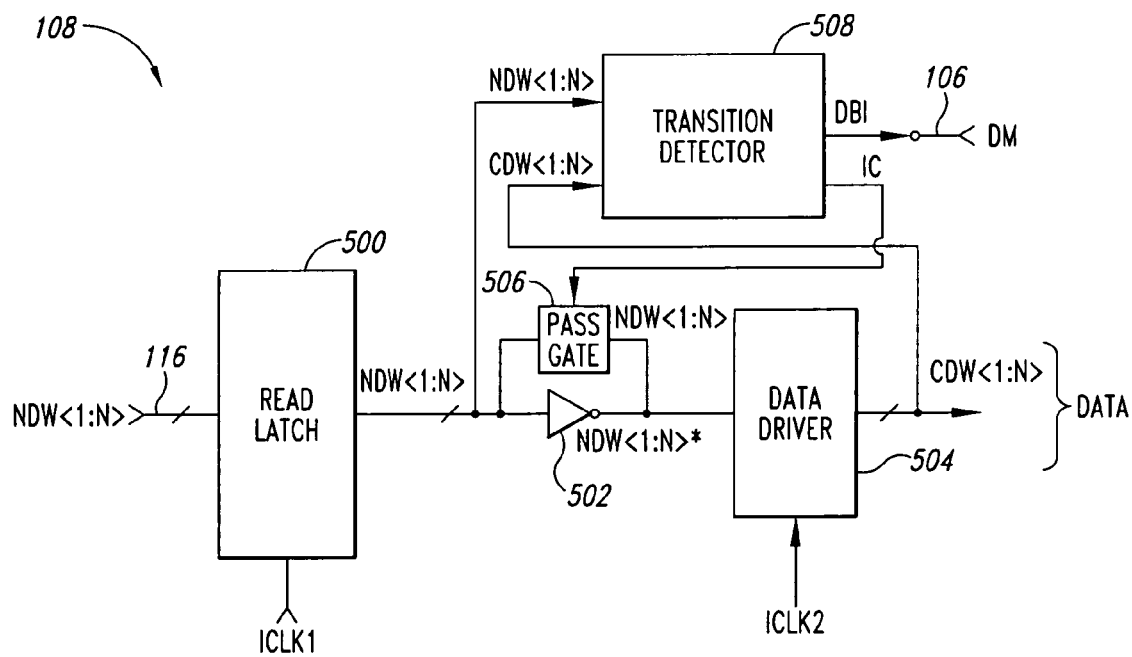
FIG. 5 is a more detailed functional block diagram illustrating one embodiment of the read/write circuit of FIG. 3.

FIG. 5 is a functional block diagram illustrating one embodiment of a portion of the read/write circuit 108 contained in the memory 102 of FIG. 3. The portion of the read/write circuit 108 depicted in FIG. 5 illustrates circuitry for generating the DBI signal and placing either the true next read data word NDW<1:N> for the inverted next read data word NDW <1:N> on the data bus DATA. The circuitry includes a read latch 500 that receives the NDW <1:N> word from the memory-cell array 114 (FIG. 3) over the internal data path 116 and latches the data word in response to an internal clock signal ICLK1 generated by the control logic 118 (FIG. 3). The read latch 500 applies the latched NDW <1:N> word through an inverter circuit 502 to apply the inverted read data word NDW <1:N>* to an input of a data driver 504. A pass gate circuit 506 is coupled to tell with the inverter circuit 502 and receives an inversion control signal IC from a transition detector 508. When the IC signal is active, the pass gate circuit 506 turns ON, bypassing the inverter circuit 502 and applying the NDW <1:N> word from the read latch 500 to the input of the data driver 504. The data driver 504 latches either the NDW <1:N> for NDW <1:N>* word applied on its input in response to an internal clock signal ICLK2 generated by the control logic 118 (FIG. 3) and outputs the latched data word as the next read data word CDW<1:N> on the data bus DATA.

The transition detector 508 receives the NDW<1:N> word from the read latch 500 and the CDW<1:N> word output from the data driver 504 on the data bus DATA. The transition detector 508 determines the number of bits that change from a first logic state in the CDW<1:N> word to the complementary logic state in the NDW<1:N> word. When the detected number of bits is greater than N/2, the transition detector 508 activates the DBI signal on the data masking terminal 106 and deactivates the IC signal, turning OFF the pass gate circuit 506 and thereby causing the inverter circuit 502 to apply the NDW <1:N>* word to the input of the data driver 504. In contrast, when the detected number of bits is less than or equal to N/2, the transition detector 508 deactivates the DBI signal and activates the IC signal turning ON the pass gate circuit 506 and thereby applying the NDW <1:N> word to the input of the data driver 504.

In operation, assume an initial CDW <1:N> word has been latched by the data driver 504 and is initially being output on the data bus DATA. The read latch 500 thereafter latches the NDW <1:N> on the data path 116 in response to the ICLK1 signal, and outputs the latched word to the transition detector 508, pass gate circuit 506, and inverter circuit 502. At this point, the transition detector 508 compares the bits in the NDW<1:N> being output from the read latch 500 to the bits in the CDW <1:N> word currently being output by the data driver 504 on the data bus DATA. When the transition detector 508 determines number of bits changing from a first logic state in the CDW<1:N> word to the complementary logic state in the NDW<1:N> word is greater than N/2, the transition detector applies an active DBI signal on the data masking terminal 106 and deactivates the IC signal. In response to the deactivated IC signal, the pass gate circuit 506 turns OFF, causing the inverter circuit 502 to apply the NDW <1:N>* word to the input of the data driver 504. The ICLK2 signal thereafter clocks the data driver 504, causing the data driver to latch the NDW <1:N>* word and output this latched word as the CDW <1:N> word on the data bus DATA. In contrast, when the transition detector 508 determines number of bits changing from a first logic state in the CDW<1:N> word to the complementary logic state in the NDW<1:N> word is less than or equal to N/2, the transition detector applies an inactive DBI signal on the data masking terminal 106 and activates the IC signal. In response to the activated IC signal, the pass gate circuit 506 turns ON, causing the inverter circuit 502 to apply the NDW <1:N> word to the input of the data driver 504. The ICLK2 signal thereafter clocks the data driver 504, causing the data driver to latch the NDW <1:N> word and output this latched word as the CDW <1:N> word on the data bus DATA.

One skilled in the art will understand a variety of different circuits that may be utilized to implement the components 500–508 of FIG. 5, and will also appreciate other embodiments that may be utilized for comparing the NDW <1:N> and NDW <1:N>* words and generating the DBI signal. Moreover, one skilled in the art will understand suitable circuitry for the memory controller 304 (FIG. 3) for receiving the DBI signal and CDW<1:N> word, and inverting or not inverting the received word in response to the DBI signal. For example, one embodiment could include the pass gate circuit 506 and inverter circuit 502 interconnected as shown in FIG. 5, with the DBI signal being applied to control activation and deactivation of the pass gate circuit to thereby not invert or invert the received data word.

Figure 6:
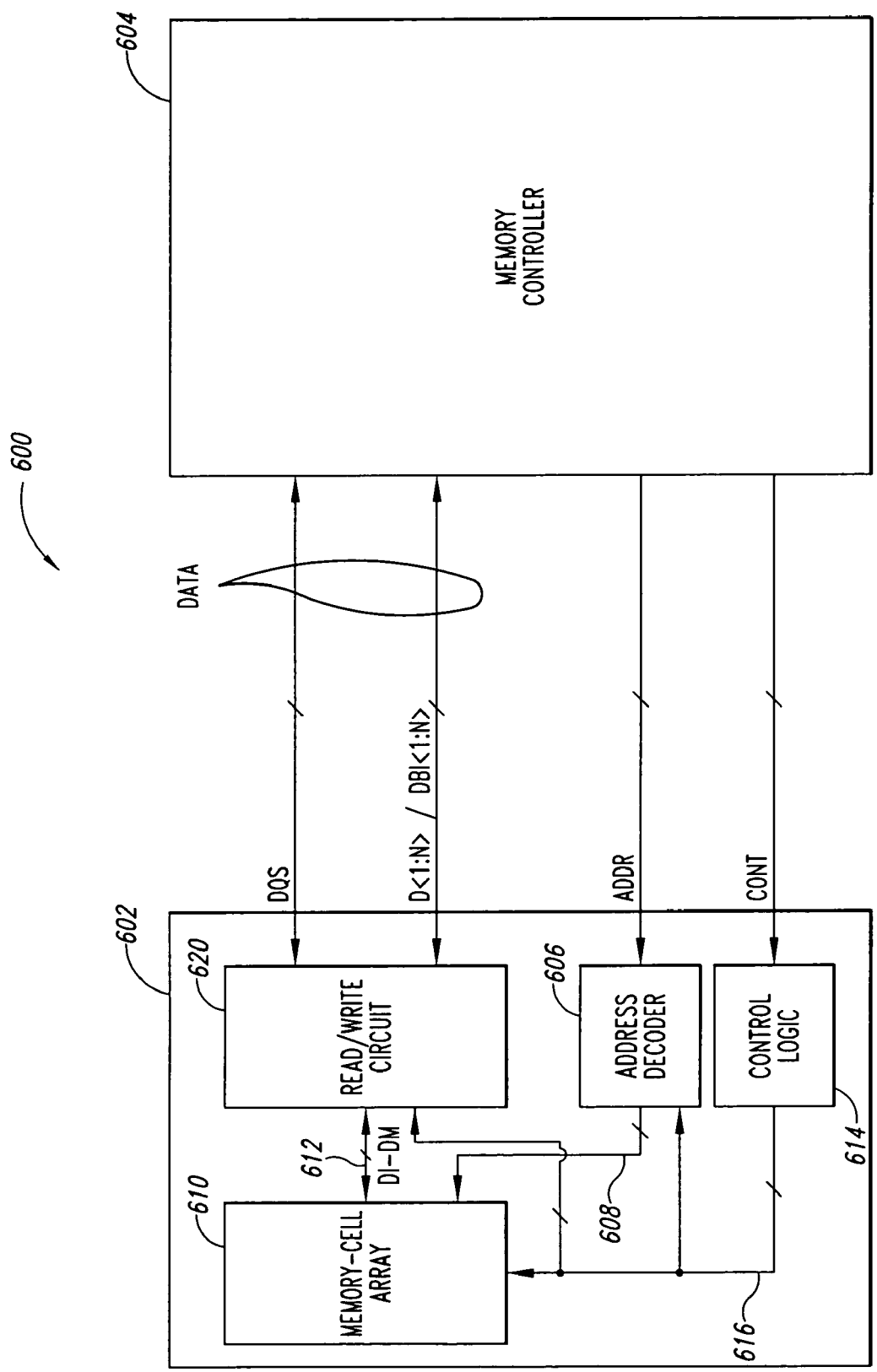
FIG. 6 is a functional block diagram illustrating a memory system including a memory and memory controller that transfer data bus inversion information over a data bus according to another embodiment of the present invention.

FIG. 6 is a functional block diagram illustrating a memory system 600 including a memory 602 and memory controller 604 that place data bus inversion information in a data bus inversion word DBI<1:N> that is transferred over a data bus DATA according to another embodiment of the present invention. In the memory system 600, each read and write cycle includes the data bus inversion word DBI<1:N> being transferred over the data bus DATA along with read or write data words D<1:N>, each data word including bits DQ1–N which have been inverted or not inverted to minimize the switching of bits between consecutive data words. The receiving device, either the memory 602 or controller 604, thereafter uses bits in the received data bus inversion word DBI<1:N> to determine whether to invert each of the received data words D<1:N>, as will be described in more detail below.

The memory 602 includes components and signals designated 606–618, with each of these components operating in the same way as the corresponding component 310–320 in the memory 302 of FIG. 3, and thus, for the sake of brevity, the operation of these components will not again be described in detail. A read/write circuit 620 is coupled to the data bus DATA and operates during read operations to receive a group of data words D1–DM from the memory-cell array 610 over the internal data path 612, each data word including a plurality of bits DQ1–N. The read/write circuit 620 generates the data bus inversion word DBI<1:N> using the data words D1–DN and inverts or leaves true each data word D1–DM in the group. The read/write circuit 620 thereafter sequentially applies the DBI<1:N> word and inverted or not inverted D1–DM words on the data bus DATA in synchronism with a data strobe signal DQS. The data bus inversion word DBI<1:N> includes a plurality of inversion bits I1–N, each inversion bit indicating whether the bits DQ1–N or a segment of the bits in a corresponding data word D1–DM are inverted or not. For example, in one embodiment the data bus is 32 bits wide (N=32) and the group of data words D1–DM includes 8 data words (M=8), each data word including four bytes B1–B4 corresponding to the bits DQ1–8, DQ9–16, DQ17–24, and DQ25–32, respectively. In this embodiment, the DBI<1:N> includes 32 inversion bits, each inversion bit being associated with one of the 32 bytes contained in the 8 data words D1–DM (4 bytes/data word times 8 data words equals 32 bytes). The process executed by the read/write circuit 620 in generating the DBI<1:N> word will be described in more detail below.

The operation of the memory system 600 will now be described in more detail with reference to the signal timing diagram of FIG. 7 that illustrates a read cycle of the memory system 600. To commence a read cycle, the memory controller 604 applies a read command READ to the memory 602 at a time T1 in the form of the appropriate address and control signals on the ADDR and CONT busses, respectively. The address decoder 606 latches the applied decoded address signals to the memory-cell array 610 which, in turn, accesses the addressed memory cells and transfers the corresponding group of data words D1–DM over the internal data path 612 to the read/write circuit 620. The control logic 614 generates the appropriate control signals 616 to control the address decoder 606, array 610, and read/write circuit 620 during the read operation.

At this point, the read/write circuit 620 compares the bits in successive data words D1–DM and generates the inversion bits I1–N in response to each comparison, and places each of the inversion bits into a single word to thereby form the data bus inversion word DBI<1:N>. The read/write circuit 620 thereafter applies the DBI<1:N> word on the data bus DATA at a time T2 as shown in FIG. 7 along with the DQS signal. The read/write circuit 602 thereafter sequentially places each of the data words D1–DM on the data bus at times T3, T4, and T5 as illustrated in FIG. 7.

The memory controller 604 latches each of the applied data bus inversion word DBI<1:N> and data words D1–DM in response to the DQS signal, and uses the inversion bits in the I1–N to invert or not invert segments of data in the data words. When a given I1–N bit is set, an segment of bits in a corresponding data word D1–DM is to be inverted, and the memory controller 604 inverts the bits of the segment. For example, in the previous example, assume a first inversion bit I1 is set and is associated with the byte B1 in the data word D1. In this situation, the data bits DQ1–8 corresponding to the byte B1 in data word D1 were inverted by the memory 602 before being placed on the data bus DATA, so the memory controller 604 inverts these bits to obtain the true data. When the inversion bit I1 bit is cleared, the byte B1 has not been inverted and the memory controller 604 does not invert the bits DQ1–8 corresponding to this byte. After inverting or not inverting each of the received bytes in each of the data words D1–DM, the memory controller 604 processes the data contained in these data words as required. The memory system 600 operates in an analogous way during write operations, except that circuitry in the memory controller 604 operates in the same way as the read/write circuit 602 to generate the DBI<1:N> word and the inverted and not inverted data words D1–DM, and the read/write circuit receives and processes the received DBI<1:N> and D1–DM words in the same way as described for the memory controller during read operations.

With the memory system 600, the memory system uses the data bus DATA during both read and write operations to transfer data bus inversion information, and in this way eliminates the need for an extra dedicated pins on the memory 602 or memory module containing a plurality of memories. As previously discussed, reducing the number of pins reduces the cost of memory modules containing a plurality of memories 602. The memory system 600 minimizes the switching of bits DQ1–N in consecutive data words D1–DM, which reduces the current required by the read/write circuit 620 in driving the data bus DATA. This reduces the timing variation or SSO pushout between data words D1–DM and the DQS signal as the width N of the data bus DATA increases and the valid duration of data words decreases. More bits would otherwise change logic states between consecutive data words DM1–DM, resulting in SSO pushout without the data bus inversion scheme of the memory system 600.

Figures 7, 8:
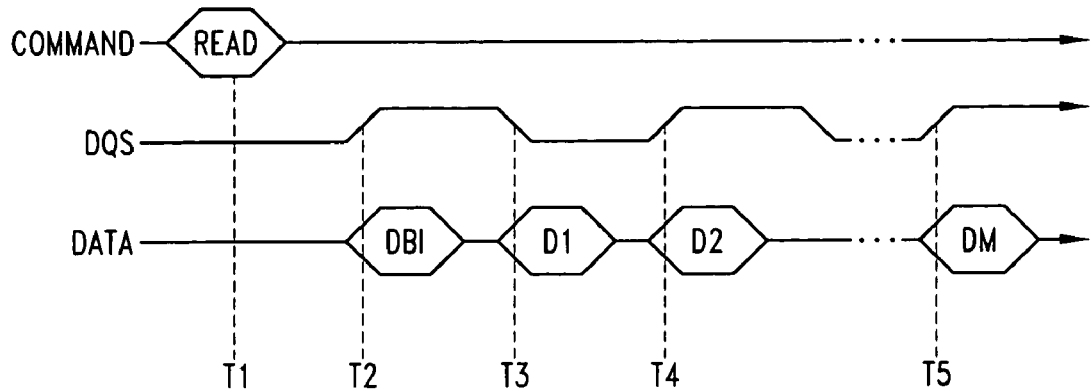
FIG. 7 is a signal timing diagram illustrating the operation of the memory system of FIG. 6 during a read or write operation in transferring data bus inversion information over the data bus.
FIG. 8 is a diagram illustrating in more detail the process executed by the read/write circuit of FIG. 6 in more detail in generating the data bus inversion word according to one embodiment of the present invention.
Figure 9:
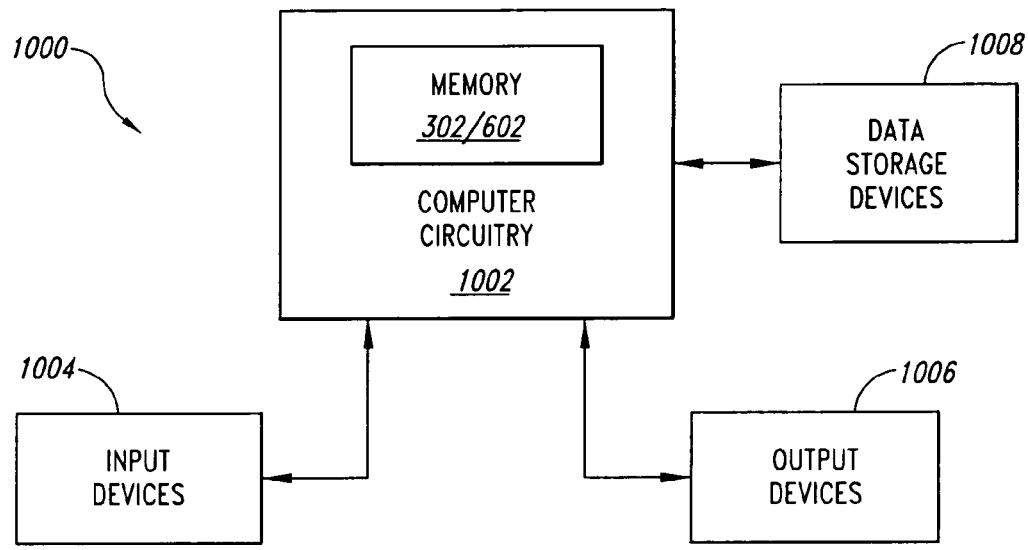
FIG. 9 is a functional block diagram of a computer system including the memory of FIG. 3 and/or FIG. 6.

FIG. 8 is a diagram illustrating the operation of the read/write circuit 620 in more detail in generating the data bus inversion word DBI<1:N>. In the example of FIG. 8, N=8 and M=8 so there are 8 bits in each of the DBI<1:N> and D1–DM words, and there are 8 data word D1–DM in the group associated with a given DBI<1:N> word. From the values shown for the data words D1, D2, D7 and D8, the inversion bits I2, I3, and I8 have the values indicated in the DBI<1:8> word. The values of the inversion bits I4–7 are indicated as "X" for unknown since the values of the data words D4–D6 are not shown. Note that the inversion bit I1 in the DBI<1:*> may need to be selected as a logic 0 or logic 1 by the read/write circuit 620 in some situations. In most situations, the bits I2–8 and DQ2–8 will determine the value of I1, but this is not always the case. For example, where 4 of the bits I2–I8 change from a first logic state in the DBI<1:8> word to the complementary logic state when compared to the bits DQ2–8 in the D1 word, and the bit DQ1 in the D1 word has the complementary logic state, the value selected for the I1 bit determines whether the data word D1 is inverted. For example, where bits I2–8 are (1111000), with I2 being the leftmost bit, and bits DQ1–8 in D1 are (00000111), with DQ1 being the leftmost bit, if the value of I1 is set to 1 then the word D1 will be inverted and if it is set to 0 then the word D1 will not be inverted.

Figure 10:
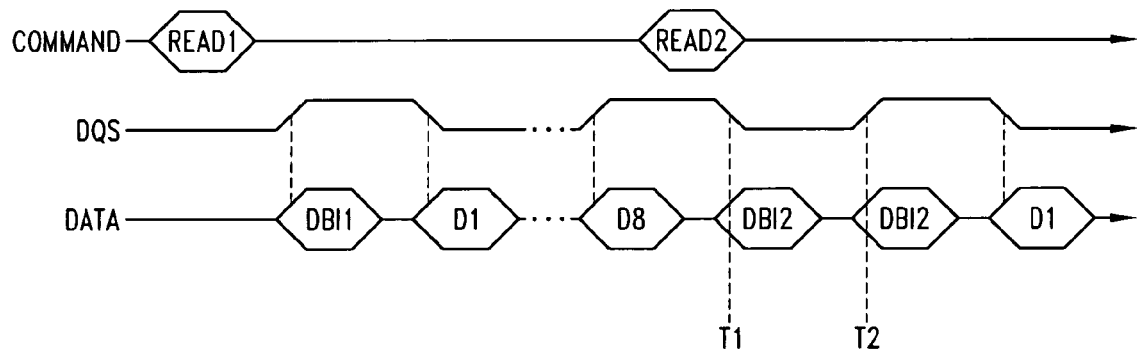
FIG. 10 is a signal timing diagram illustrating operation of the memory system of FIG. 6 according to another embodiment of the present invention.

In another embodiment of the memory system 600 of FIG. 6, the DBI<1:8> words are applied on the data bus DATA for two clock transitions to ensure the word is captured properly by a receiving device. FIG. 10 is a timing diagram illustrating the operation of the memory system 600 in this embodiment. As illustrated, the second DBI<1:8> word (DBI2) is applied on the data bus DATA for two transitions of the DQS signal at times T1 and T2. This ensures the SSO pushout of the DBI<1:8> word does not adversely affect operation of the system 600. As previously described, being the first word in a burst the DBI<1:8> word is not inverted to reduce its SSO pushout. In another embodiment, an external pin could be used to transmit a DBI signal as in the memory system 300 of FIG. 3 only for the DBI<1:8> words during concatenated bursts. In this embodiment, the DBI<1:8> word of a second and subsequent burst would be inverted or not depending on the last data word D8 of the prior burst.

One skilled in the art will understand circuitry that can be utilized to form the read/write circuit 620 and to execute the described processes in the memory controller 604 during read operations, and thus, for the sake of brevity, these circuits will not be described in detail. The same is true of required circuitry in the memory 602 and memory controller 604 during write operations, and for circuitry for the address decoders 310, 606, control logic 318, 614, and memory-cell arrays 314, 610 in memories 300 and 600. Each of the memories 300 and 600 of FIGS. 3 and 6, respectively, can be a double-data rate (DDR) synchronous dynamic random access memory (SDRAM) or other type of memory device such as a conventional SDRAM or asynchronous DRAM, as well as packetized memory devices like SLDRAMs and RDRAMs, and the principles described herein are equally applicable to any integrated circuit that transfers data words that must be latched within specified timing parameters.

FIG. 5 is a block diagram of a computer system 1000 including computer circuitry 1002 that includes the memory 302 of FIG. 3 and/or the memory 602 of FIG. 6. Typically, the computer circuitry 1002 is coupled through address, data, and control buses to the memory 302/602 to provide for writing data to and reading data from the memory. The computer circuitry 1002 includes circuitry for performing various computing functions, such as executing specific software to perform specific calculations or tasks. In addition, the computer system 1000 includes one or more input devices 1004, such as a keyboard or a mouse, coupled to the computer circuitry 1002 to allow an operator to interface with the computer system. Typically, the computer system 1000 also includes one or more output devices 1006 coupled to the computer circuitry 1002, such as output devices typically including a printer and a video terminal. One or more data storage devices 1008 are also typically coupled to the computer circuitry 1002 to store data or retrieve data from external storage media (not shown). Examples of typical storage devices 1008 include hard and floppy disks, tape cassettes, compact disk read-only (CD-ROMs) and compact disk read-write (CD-RW) memories, and digital video disks (DVDs).

Even though various embodiments and advantages of the present invention have been set forth in the foregoing description, the above disclosure is illustrative only, and changes may be made in detail and yet remain within the broad aspects of the invention. Therefore, the present invention is to be limited only by the appended claims.

The invention claimed is:

1. A method of providing data from a memory device, comprising:
providing first data;
comparing second data to the first data to determine a number of bits of the second data transitioning logic states;
in response to less than a threshold number of bits of the second data changing logic states in comparison to the bits of the first data, providing the second data and providing data inversion information concurrently with the second data from a terminal of the memory device, the terminal receiving information unrelated to data inversion information during a write operation to the memory device; and
in response to a threshold number of bits of the second data changing logic states in comparison to the bits of the first data, inverting the bits of the second data, and providing active data inversion information concurrently with providing the inverted second data.

2. The method of claim 1 wherein the terminal receiving information unrelated to data inversion information during a write operation to the memory device comprises a data masking terminal at which a data mask signal is received during a write operation.

3. The method of claim 1 wherein the threshold number of bits is one-half of the bits of the second data.

4. The method of claim 1, further comprising providing an inactive data inversion information concurrently with providing the second data in response to less than or equal to half of the bits of the second data changing logic states.

5. The method of claim 1 wherein the second data comprises a plurality of data words and the data inversion information comprises a corresponding plurality of signals, each signal associated with a respective data word of the second data.

6. A method of providing data from a memory device, comprising:
comparing bits of a sequence of data words to determine whether each bit changes logic states from one data word to another;
in response to the number of bits of a respective data word changing logic states exceeding a threshold number in comparison to a previous data word in the sequence, inverting the bits of the respective data word to provide an inverted data word instead of the respective data word in the sequence of data words;
generating bit polarity data indicative of the number of bits changing logic states from one respective data word to another in the sequence, the bit polarity data including an indicator corresponding to an inverted data word that indicates that the bits for the inverted data word are inverted;
providing the bit polarity data from data terminals of the memory device; and
providing the sequence of data words from the data terminals of the memory device.

7. The method of claim 6 wherein the threshold number is equal to one-half the bits of a data word.

8. The method of claim 6 wherein the bit polarity data is provided on the data terminals of the memory device before providing the sequence of data words.

9. The method of claim 6 wherein each of the data words and the bit polarity data are represented by N bits, and the sequence of data words includes N data words.

10. The method of claim 6 wherein providing the bit polarity data from the data terminals comprises providing the bit polarity data twice prior to providing the sequence of data words.

11. The method of claim 6 wherein providing the bit polarity data and the sequence of data words from the data terminals of the memory device occur in response to a clock signal.

12. A memory device, comprising:
data terminals;
a non-data terminal; and
a read data circuit coupled to the data terminals and the non-data terminal, the read data circuit operable to compare bits of first data to be provided on the data terminals and second data to be provided on the data terminals subsequent to the first data and determine a number of bits of the second data changing logic states in comparison to bits of the first data, the read data circuit further operable to generate data inversion information to be provided on the non-data terminal concurrently with providing the second data on the data terminals that is indicative of the number of bits of the second data changing logic states, the read data circuit having a data driver circuit coupled to the data terminals and operable in response to a threshold number of bits of the second data changing logic states in comparison to the bits of the first data to invert the bits of the second data before providing the same on the data terminals, the read data circuit further operable to generate active data inversion information to be provided on the non-data terminal concurrently with the inverted second data.

13. The memory device of claim 12 wherein the non-data terminal comprises a data masking terminal at which a data masking signal is received by the memory device during a write operation.

14. The memory device of claim 12 wherein the threshold number of bits is one-half of the bits of the second data.

15. The memory device of claim 12 wherein the data driver circuit is further operable to provide the second data on the data terminals without inversion in response to the number of bits of the second data changing logic states in comparison to the bits of the first data being less than or equal to the threshold number of bits and the read data circuit is operable to generate inactive data inversion information to be provided on the non-data terminal concurrently with the inverted second data.

16. The memory device of claim 12 wherein the non-data terminal comprises a plurality of non-data terminals and second data comprises a plurality of data words, the read data circuit operable to generate data inversion information for each of the data words to be provided on the plurality of non-data terminals concurrently with providing the plurality of data words on the data terminals, each data inversion information indicative of the number of bits changing logic states for the respective data word.

17. A memory device, comprising:
data terminals;
a data circuit coupled to the data terminals and operable to determine whether bits of a sequence of data words to be provided on the data terminals change logic states from one data word to another and generate word polarity data indicative of the number of bits changing logic states from one respective data word to another in the sequence, the data circuit further operable to provide the word polarity data and the sequence of data words on the data terminals, the data circuit having a data driver circuit coupled to the data terminals and operable in response to the number of bits of a respective data word changing logic states exceeding a threshold number in comparison to a previous data word in the sequence to invert the bits of the respective data word to provide an inverted data word, the data circuit further operable to include as part of the polarity data an indicator corresponding to the inverted data word that indicates that the bits for the inverted data are inverted.

18. The memory device of claim 17 wherein the threshold number is equal to one-half the bits of a data word.

19. The memory device of claim 17 wherein the data circuit is operable to provide the polarity data on the data terminals prior to providing the sequence of data words on the data terminals.

20. The memory device of claim 17 wherein each of the data words in the sequence and the bit polarity data are represented by N bits, and the sequence of data words includes N data words.

21. The memory device of claim 17 wherein the data circuit is operable to provide the polarity data on the data terminals twice prior to providing the sequence of data words on the data terminals.

22. The memory device of claim 17 wherein the data circuit is operable to provided the polarity data and the data words of the sequence on the data terminals in response to a clock signal.

* * * * *